United States Patent [19]

Tarbell et al.

[11] 4,110,501

[45] Aug. 29, 1978

[54] SPLICING STRIP

[75] Inventors: Harlan E. Tarbell, Torrance, Calif.; Paul J. Raabe, Lombard, Ill.

[73] Assignee: Grefco, Inc., Bala Cynwyd, Pa.

[21] Appl. No.: 784,779

[22] Filed: Apr. 5, 1977

[51] Int. Cl.² .................. B32B 11/02; B32B 11/10
[52] U.S. Cl. ................... 428/40; 260/42.32; 260/42.43; 260/823; 428/77; 428/140; 428/189; 428/190; 428/255; 428/332
[58] Field of Search ............... 428/40, 140, 332, 225, 428/323, 352, 354, 295, 255, 189, 190, 77; 260/42.32, 42.43, 823

[56] References Cited

U.S. PATENT DOCUMENTS

| 3,455,077 | 7/1969 | Long | 52/459 |
| 3,556,894 | 1/1971 | Bernard | 428/40 |
| 3,582,446 | 6/1971 | Stolki | 428/136 |
| 3,753,755 | 8/1973 | Olson | 428/40 |
| 3,770,559 | 11/1973 | Jackson | 428/40 |

Primary Examiner—George F. Lesmes
Assistant Examiner—P. Thibodeau
Attorney, Agent, or Firm—Everett H. Murray, Jr.; Brian G. Brunsvold; Dennis P. O'Reilley

[57] ABSTRACT

A splicing strip is provided comprising a pair of mastic layers and a porous, flexible reinforcing sheet with the mastic layers in adherent contact through openings in the reinforcing sheet. A release sheet is attached to at least the outside face of one of the mastic layers, and a sheet of non-tacky material is attached to the outside face of the other of the mastic layers.

19 Claims, 3 Drawing Figures

SPLICING STRIP

FIELD OF THE INVENTION

This invention relates to a splicing strip for splicing together two bodies, such as flexible plastic components especially as used to cover expansion joints. More particularly, this invention relates to a splicing strip which is formed of reinforced tacky materials which exhibit minimal elastomeric properties.

BACKGROUND OF THE INVENTION

A frequent problem in the covering of joints, particularly in the building industry, is one of providing a material in readily applicable form which is capable of being repeatedly stretched and contracted under normal conditions of use.

Relatively expensive non-tacky elastomeric materials such as sheets of cured neoprene or ethylene-propylene rubber have been proposed for use in splicing components together. However, such cured elastomeric materials are usually difficult and time-consuming to bond to the components of the joint, and solvent-based adhesives have been required to effect adequate bonding. The use of the solvent-based adhesive often tends to curl the elastomeric sheet material, which can lead to discontinuous and unsatisfactory bonding. Furthermore, plasticizers, as is known, tend to migrate to the surface of the usual elastomeric materials and thereby damage the adhesion of the solvent-based adhesives.

Tacky materials such as uncured butyl-based formulations have been used for exterior and interior patching. For example, uncured butyl-formulated materials are commonly used for patching holes in roofs.

These uncured butyl-formulated materials are extremely tacky and form excellent bonds with the substrate materials. Further, such butyl materials will remain soft for years, have excellent resistance to exterior aging and low cold flow characteristics.

The principal disadvantage of using these uncured butyl-formulated materials in splicing is that they have low tensile strength and very poor elastic memory. After a few tension-compression cycles, these materials will stretch so much they will break. The rupture of the materials follows the pattern that prevails when a piece of chewing gum is alternately stretched and then compressed between two rigid supports.

It has been proposed to utilize a splicing strip formed of a tacky sheet of butyl-based rubber having a piece of glass scrim or screen on its exterior face. Field tests of this form of splicing strip proved unsatisfactory. Separation between the surface layer and the butyl layer occurred, which eventually resulted in failure of the butyl layer. Also, the glass screen on the surface decomposed with age due to the movement of the glass fibers causing frictional cutting interaction of the glass fibers between themselves.

BROAD DESCRIPTION OF THE INVENTION

The invention provides a splicing strip for splicing together two or more components comprising: a flexible, reinforcing sheet of fibers, usually organic and preferably synthetic, with openings having a largest diameter of about 0.05 to 0.50 inches and a pair of mastic layers of tacky material, one of the tacky mastic layers disposed on each side of the flexible sheet, the mastic layers being in adherent contact with each other through the openings in the flexible sheet.

The mastic layers preferably comprise by weight 10 to 50 parts of butyl rubber, 10 to 50 parts polybutene, and 10 to 80 parts of filler selected from the group consisting of calcium carbonate, mineral filler such as clay, asbestos or similar fibers, carbon black, shredded rubber and mixtures thereof.

It is preferred that a release sheet be releasably attached to the outside face of at least one of the mastic layers to permit removal of the release sheet and placement of the thus exposed outside face of the mastic layer on the surface or components to be spliced.

Optionally, a sheet of non-tacky material or a second release sheet is attached to the outside face of the other mastic layer to facilitate easy storage and handling of the splicing strip by limiting exposure of the surfaces of the tacky mastic layers.

Preferably, a stress distribution ribbon having a width substantially less that the splicing strip is adhesively attached to and along the longitudinal center line of the outside face of at least one of the layers of mastic. The stress distribution ribbon precludes contact of the mastic with the surfaces of the components proximate the face of the mastic layer.

The physical compatibility of the materials of the new splicing strip provides outstanding resistance to movement from mechanical stresses as well as thermal cycling. There is thus provided an inexpensive, easily applied splicing strip that possesses surprising ability to withstand repeated mechanical stresses as well as thermal expansion and contraction cycles.

DETAILED DESCRIPTION OF THE PREFERRED EMBODIMENT

Figure 1:
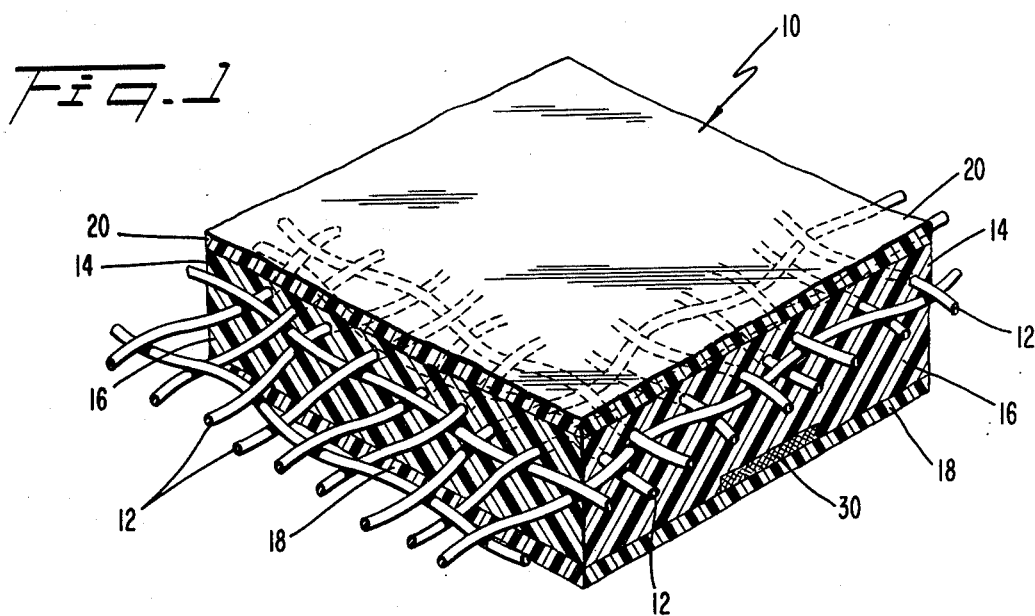
FIG. 1 is a greatly enlarged side elevation view of an embodiment of this invention, with some parts broken away, and some parts shown in section.

As seen in FIG. 1, the splicing strip, generally 10, comprises a flexible reinforcing sheet 12 made of fibers with openings having a largest diameter of approximately 0.05 to 0.50 inches.

There are four important criteria to be considered in selection of a suitable reinforcing sheet. First, the material must be strong enough to withstand strains placed upon it in all directions. Second, the reinforcing sheet must be flexible and retain strength at a temperature range of about −50° to 200° F, and be able to withstand the elements if it should become exposed.

Third, the reinforcing sheet must not exert excess strain against the mastic when it is shaped over the area to be spliced. Fourth, the reinforcing sheet must have holes in it large enough for the layers of mastic on each side of the sheet to be able to make adherent contact with each other, yet cover enough area to effectively reinforce the splicing strip.

The presently preferred material for the reinforcing sheet is a rochelle knit, lock-stitch, 100% 220-denier polyester yarn, 24 gauge fabric with 1200 front and 1200 back ends.

Other preferred materials for the yarn are other polyester embodiments, nylon, polypropylene and tire-grade lubricated glass fiber. Other materials that would be satisfactory, but possess some disadvantages, are rayon, polyvinylchloride and metal.

A knit lock-stitch material is most desirable, as it will tend to distribute the strain and will not ravel. However, a woven or other knit fabric may be used.

There is no minimum fineness to the fibers to be used in the reinforcing sheet as long as enough of them are combined in a strand. A monofilament material can be used directly in the stitched or woven sheet.

If the combination of denier and strand size gets too large, stiffness will result, causing an inferior product. The ideal range is from 190–300 denier with a gauge of 20–30. An acceptable range would be from 100–1200 denier and a gauge of 10–40 varying with the type of material chosen. The dimensions of the openings can vary from about 0.05 to 0.50 inches with 0.10 and 0.25 inches being preferred. The openings are preferably round or oval, but in woven materials they may be shaped like a square or rectangle, as in a screen.

Also in accordance with the invention, on each side of the flexble reinforcing sheet 12 is disposed a layer of tacky mastic material 14 and 16. Layers 14 and 16 are in adherent contact with each other across the openings in the flexible reinforcing sheet 12.

Preferably, the mastic layer is comprised by weight 10–50 parts of butyl rubber, 10–50 parts of polybutene and 10–80 parts of filler selected from the group consisting of calcium carbonate, mineral fillers such as clay, asbestos or other similar fibers, carbon black, shredded rubber and mixtures thereof.

Butyl rubber is used to describe an isobutylene-isoprene butadiene rubber produced by copolymerization of isobutylene with a small proportion (typically about 0.1–2.0%) of isoprene and/or butadiene. The butyl rubber in the mastic layers is in its uncured, tacky state. The butyl rubber normally has a molecular weight of from about 350,000–450,000.

Preferably, the splicing strip includes a release sheet releasably attached to the outside face of at least one of the layers of mastic to permit removal of the release sheet and adhesive placement of the thus exposed outside face of the mastic on the surface of components to be spliced. As here embodied, the release sheet 18 is releasably attached to the outside face of the mastic layer 16. Removal of the release sheet 18 exposes the tacky outside surface of the mastic layer 16 permitting adhesive attachment of the splicing strip to the surface of the components 22 and 24 (FIG. 2) to be spliced. The release sheet is preferably a silicone treated sheet of kraft paper, to which the mastic layer only slightly adheres.

It may be preferred that a release sheet be placed on each of the outside faces of the mastic layers 14 and 16. In this manner, the splicing strip may be transported and handled without exposure to the tacky mastic surfaces. Furthermore, removal of both release sheets would provide a splicing strip which may be sandwiched between two or more components.

It is preferred that a sheet of non-tacky material be in adhesive contact with the outside face of the mastic layer not covered by the release sheet. As embodied herein, a sheet 20 of non-tacky material is attached to the outside face of layer 14 of the mastic material. While sheet 20 may be release paper that is removable, it is preferable that it be polymeric film capable of withstanding outdoor weathering. The polymeric film for the non-tacky sheet 20 is made of material such as polyester, polyvinyl fluoride, polyvinylidene chloride, polyvinyl chloride, chlorinated rubber, chlorosulfonated polyethylene, acrylonitrile-butadiene-styrene copolymer, polypropylene, cured butyl rubber, chloroprene, ethylene-propylene based copolymers, or glass cloth materials treated with the above polymers. A particularly preferable material for the polymeric film is ethylene-propylene diene monomer.

It is also preferred that the splicing strip include a stress distribution ribbon having a width substantially less than the splicing strip and being adhesively attached to the outside face of at least one of the layers of mastic to be placed on components to be spliced, the ribbon being located substantially along the longitudinal center line of the mastic layer.

Notwithstanding the reinforcing layer 12 between the layers of mastic 14 and 16, movement of the components spliced by the splicing strip concentrates stresses at the joint between the components. This concentration of stress repeatedly applied to the same area of the mastic layer may cause premature failure. Accordingly, means have been devised to distribute the stress applied to the splicing strip at the joint between the components being spliced.

Figure 3:
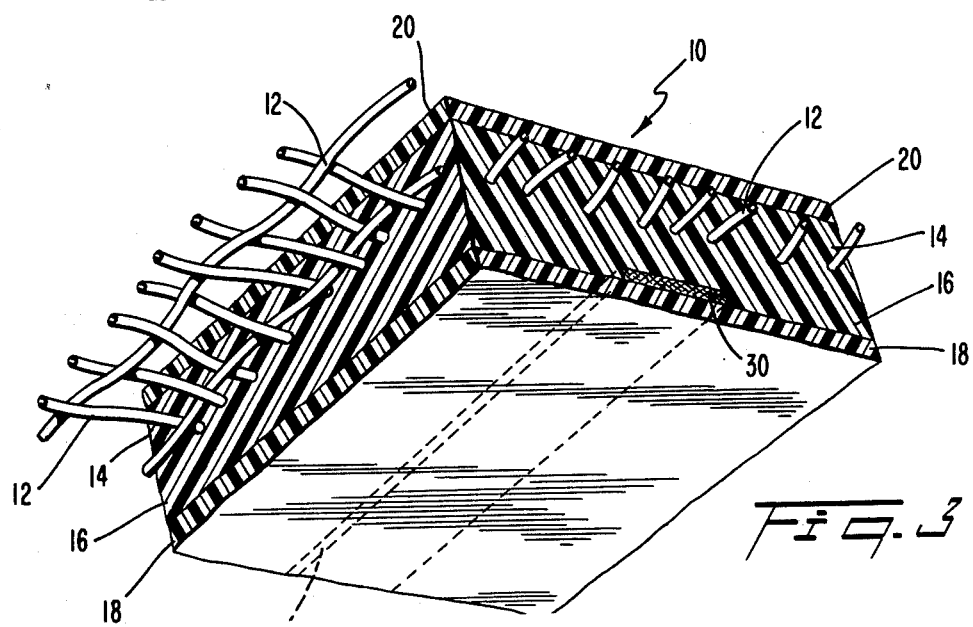
FIG. 3 is a perspective view of the bottom of a splicing strip of this invention including the stress distribution ribbon.

As embodied herein, the stress distribution ribbon 30 (FIG. 3) is adhesively attached to the outside face of the mastic layer 16 that is to be placed on the components 22 and 24 to be spliced. The stress distribution ribbon 30 is located along the longitudinal center line of the mastic layer 16 such that centrally locating the splicing strip 10 over the joint 32 between the components 22 and 24 to be spliced, the stress distribution ribbon will be centrally located over the joint 32 as well.

The stress distribution ribbon is of a material which precludes contact of the mastic 16 with the component 22, 24 surface proximate the ribbon 30. It is preferred that the ribbon 30 be a polyester cloth, although other similar cloth or ribbon or plastic film may be used.

The stress distribution ribbon 30 has a width of approximately one-fourth that of the splicing strip 10 and is centrally located so that adequate mastic face area on each side of the ribbon is available for contact to the components 22, 24 to be spliced. By precluding mastic contact with the component in the narrow band of area along the joint 32 to be spliced, stress induced at that joint by movement of the components 22, 24 is distributed evenly over the surface area of the splicing strip 10. In this way, the potential for premature failure of the splicing strip at the point directly over the joint is reduced.

If the splicing strip is to be used as an adhesive sealing device between two or more components, stress distribution ribbons may be attached to the splicing strip on either face of the mastic layers at locations where action of the components to be spliced or sealed may concentrate stresses.

Figure 2:
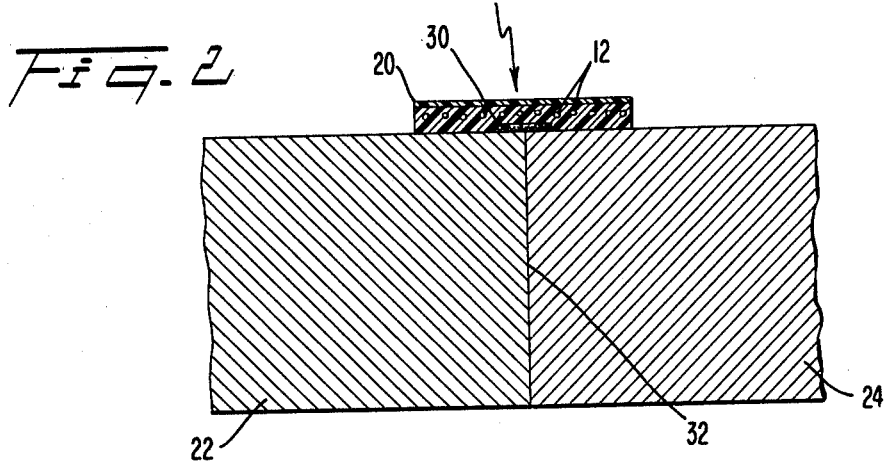
FIG. 2 is a side elevation view of a joint formed utilizing the splicing strip of FIG. 1.

FIG. 2 illustrates a joint covered with the splicing strip of the invention. The ends of a pair of expansion joint covers 22, 24 are placed in abutting contact or may be in spaced relationship. Release sheet 18 is removed from the splicing strip 10 and the splicing strip 10 is installed over the joint taking care to insure overall contact of the splicing strip with the adjacent surface of the expansion joint covers 22 and 24. Where stress distribution ribbon 30 is used in conjunction with the splicing strip 10, care must be taken to insure that the stress distribution ribbon is centrally located over the joint 32. The exposed surface of the mastic layer 16, after removal of the release sheet 18, is pressed into adherent contact with the covers 22 and 24.

The following example provides a further disclosure of a presently preferred embodiment of the invention. Mastic layers 14 and 16 are formed by extruding a thoroughly mixed formulation containing 20 parts butyl rubber, 20 parts polybutene and 60 parts of mineral filler comprising a principally calcium carbonate and small amounts of asbestos (about 0–5% weight of the filler) and carbon black (about 0.50% by weight of the filler). The reinforcing layer 12 comprises a rochelle knit, lockstitch, 100% 220-denier polyester yarn, 24 gauge fabric with 1200 front and 1200 back ends. A sheet of silicone treated craft paper is pressed on one or both of the mastic layers 14 and 16 and if one of the mastic layers is to be exposed to weather and not attached to any surface, a non-tacky sheet of polymeric film is attached to the face of that mastic layer. The stress distribution ribbon 30 is centrally located on the surface of the mastic layer 16 to be attached to the surface of the components to be spliced. Finally, the exposed faces of the mastic layers are then laminated on opposite faces of the reinforcing layer 12.

What is claimed is:

1. A splicing strip, comprising:
   (a) a flexible, elongated reinforcing sheet of fibers with openings having a largest diameter of approximately 0.05 to 0.50 inches;
   (b) a pair of tacky, mastic layers of material comprising by weight 10 to 50 parts of butyl rubber, 10 to 50 parts polybutene and 10 to 80 parts of filler selected from the group consisting of calcium carbonate, mineral fillers, asbestos, carbon black, shredded rubber and mixtures thereof, one of said mastic layers being disposed on each side of said flexible sheet, said mastic layers being in adherent contact with each other across the openings in said flexible sheet; and
   (c) a stress distribution ribbon having a width substantially less than said splicing strip and being adhesively attached to and substantially on the longitudinal center line of the exposed face of at least one of said mastic layers, said ribbon being impermeable to said mastic.

2. The splicing strip as in claim 1 including a release sheet releasably attached to the outside face of at least one of said layers of mastic to permit removal of said release sheet and adhesive placement of the thus exposed outside face on the surface of components to be spliced.

3. The splicing strip as in claim 2 wherein said release sheet is silicon treated paper.

4. The splicing strip as in claim 2 also including a sheet of non-tacky material in adhesive contact with the outside face of the other of said mastic layers.

5. The splicing strip as in claim 4 wherein said non-tacky material is a polymeric film capable of withstanding outdoor weathering.

6. A splicing strip, comprising:
   (a) a flexible, elongated sheet of fibers with openings having a largest diameter of approximately 0.05 to 0.50 inches;
   (b) a pair of tacky, mastic layers of material comprising by weight 10 to 50 parts of butyl rubber, 10 to 50 parts of polybutene and 10 to 80 parts of filler selected from the group consisting of calcium carbonate, mineral fillers, asbestos, carbon black, shredded rubber and mixtures thereof, one of said mastic layers being disposed on each side of said flexible sheet, said mastic layers being in adherent contact with each other across the openings in said flexible sheet;
   (c) a release sheet releasably attached to the outside face of one of said layers of mastic to permit removal of said release sheet and adhesive placement of the thus exposed outside face on the surface of components to be spliced;
   (d) a protective sheet of non-tacky, polymeric film in adhesive contact with the outside face of the other of said mastic layers; and
   (e) a stress distribution ribbon having a width substantially less than said splicing strip and being adhesively attached to and substantially on the longitudinal center line of the outside face of said mastic layer to which said release sheet is attached, said ribbon being impermeable to said mastic.

7. The splicing strip as in claim 6 wherein said release sheet is silicon treated paper.

8. The splicing strip as in claim 6 wherein said polymeric film is 1–50 mils thick.

9. The splicing strip as in claim 8 wherein said polymeric film is selected from the group consisting of polyester, polyvinyl fluoride, polyvinylidene chloride, polyvinyl chloride, chlorosulfonated polyethylene and stabilized rubbers.

10. The splicing strip as in claim 8 wherein the polymeric film is ethylene-propylene diene monomer.

11. The splicing strip as in claim 6 wherein said stress distribution ribbon is double knit polyester cloth.

12. The splicing strip as in claim 6 wherein the width of said stress distribution ribbon is approximately one-fourth that of the splicing strip.

13. The splicing strip as in claim 6 wherein a stress distribution ribbon is adhesively attached substantially along the longitudinal center line of the outside face of each mastic layer.

14. A splicing strip for joining together two or more components, comprising:
   (a) a flexible reinforcing sheet of synthetic organic fiber with openings having a largest diameter of approximately 0.05 to 0.50 inches;
   (b) a pair of tacky, mastic layers of material comprising 20 parts butyl rubber, 20 parts polybutene and 60 parts mineral filler, one of said mastic layers disposed on each side of said flexible sheet, said mastic layers being in adherent contact with each other across the openings in said flexible sheet;
   (c) a release sheet releasably attached to the outside face of one of said layers of mastic to permit removal of said release sheet and adhesive placement of the exposed outside face on the surface of components to be spliced;
   (d) a protective sheet of non-tacky polymeric film in adhesive contact with the outside face of the other of said mastic layers; and
   (e) a stress distribution ribbon having a width substantially less than said splicing strip and being adhesively attached to and substantially along the longitudinal center line of the outside face of the layer of mastic being placed in contact with the components to be spliced, said ribbon being of a material that precludes contact of the mastic with the component surface proximate said ribbon.

15. The splicing strip as in claim 14 wherein said flexible sheet of synthetic organic fiber comprises a rochelle knit, lock-stitch fabric of yarn having openings with a largest diameter of from 0.10 to 0.25 inches.

16. The splicing strip as in claim 15 wherein said synthetic organic fiber is polyester.

17. The splicing strip as in claim 14 wherein the stress distribution ribbon is double knit polyester cloth.

18. The splicing strip as in claim 14 wherein the width of said stress distribution ribbon is approximately one-fourth that of the splicing strip.

19. The splicing strip as in claim 14 wherein the stress distribution ribbon is adhesively attached substantially along the longitudinal center line of the outside face of each mastic layer.

* * * * *